United States Patent [19]

Ammer

[11] 3,839,162

[45] Oct. 1, 1974

[54] METHOD AND APPARATUS FOR THE DETERMINATION OF THE CONCENTRATION OF RELEVANT IONS IN AQUEOUS SOLUTIONS

[76] Inventor: Heinzgert Ammer, 15 Stockheimerstr., 7129 Guglingen, Germany

[22] Filed: Feb. 1, 1972

[21] Appl. No.: 222,466

[30] Foreign Application Priority Data
Feb. 1, 1971   Austria ................................ 784/71

[52] U.S. Cl. ......... 204/1 T, 204/195 R, 204/195 G, 204/195 M, 204/263, 210/38
[51] Int. Cl. ......................................... G01n 27/46
[58] Field of Search ............ 204/1 T, 195 R, 195 G

[56] References Cited
UNITED STATES PATENTS
3,306,837   2/1967   Riseman et al. ................ 204/195 G
FOREIGN PATENTS OR APPLICATIONS
271,717   11/1961   Netherlands .................... 204/195 G Primary Examiner—T. Tung

[57] ABSTRACT

A system for determining the concentration of specific ions in a first aqueous solution wherein a second aqueous solution containing the specific ions is treated in an ion exchanger so that a third aqueous solution having a known concentration of the specific ions emerges therefrom. The first and third aqueous solutions are directed to chambers, respectively, and brought into communication through a diaphragm. A measuring electrode is positioned in the solutions in each chamber and the potential difference between the electrode is measured. In a case where the first aqueous solution is treated in another ion exchanger of the same characteristics as the ion exchanger for the second solution, the potential difference will serve to indicate changes in the behavior of the said another ion exchanger.

4 Claims, 1 Drawing Figure

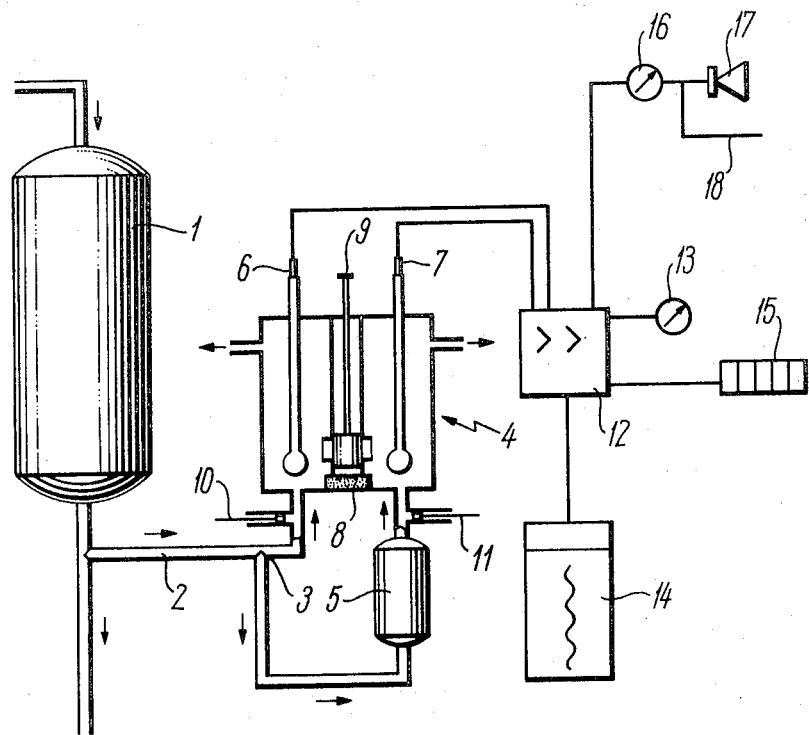

METHOD AND APPARATUS FOR THE DETERMINATION OF THE CONCENTRATION OF RELEVANT IONS IN AQUEOUS SOLUTIONS

The present invention relates to a method for the determination of the concentration of relevant ions in aqueous solutions, in particular the concentration of hydrogen or sodium ions in raw or treated water, by measuring the potential difference between a measuring electrode which dips into the aqueous solution and is sensitive to the relevant ions and a reference electrode which dips into the reference solution containing the relevant ions, said reference solution communicating with the aqueous solution through a diaphragm.

Concentration measurements and especially pH value measurements have a great variety of applications, for example in food chemistry, agricultural chemistry, textile industry, paper industry, in medicine and last but not least in the field of water analysis. In almost all fields of application the solution to be measured is sufficiently buffered, so that the ion concentration to be determined is not changed appreciably by external influences. In the case of water analysis, however, buffered solutions are only used when analysing heavily thickened water, such as boiler water or saliferous well water and mineral water. Especially water which has been treated in plants for complete softening only contains a small quantity of buffer substances, so that the ion concentration may considerably change due to external influences. It can be observed, for example, that the pH value in neutral, completely softened water which is exposed to the atmosphere only a few seconds decreases from 7 to 5 under the action of the carbonic acid in the air (cf. H. Ammer, Year Book "Vom Wasser," Verlag Chemie, Weinheim, Vol. 34, page 381, FIG. 13). In addition, the determination of the pH value of water, which has been weakly buffered or not buffered at all, is extremely difficult, since the potential, if at all, only very slowly builds up to a definite state at the measuring electrode arrangement. Moreover, similar difficulties are also encountered in determining the pH value of weakly or unbuffered waters by means of dye indicators.

It is known that a substantial part of the measuring difficulties concerning the build-up time and definition of the potential depends on the type and finish of the reference electrode. A calomel or silver-silver chloride electrode is frequently used as reference electrode. In the case of a silver-silver chloride electrode a silver wire the surface of which is strongly enriched with silver chloride is immersed in a saturated or very strongly concentrated potassium chloride solution. The reference potential is the potential difference of the silver wire as compared to the potassium chloride solution. The electrical connection to the aqueous solution to be measured, and consequently the connection to the measuring electrode, is ensured by means of a diaphragm which, on the one hand, must be largely permeable to current and, on the other, separate the potassium chloride solution from the aqueous solution to be measured. This type of reference electrodes requires a considerable degree of care and maintenance, in particular in the case of continuous operation. Moreover, when employing the known method, between the reference solution and the aqueous solution to be measured a diffusion potential builds up at the diaphragm, said potential depending on the type of the two solutions and the design of the diaphragm; consequently, it adversely affects the measuring result. Neither can this diffusion potential be properly determined with the aid of a calibration liquid, i.e. strongly buffered solutions with a known pH value, because the use of such calibration solutions cause other diffusion potentials to build up than those building up with respect to the aqueous solution to be examined. The only possibility therefore is to keep the diffusion potential as constant as possible by generating a pressure at the diaphragm in the potassium chloride solution which is higher than the pressure in the material under measurement, so that a substantially constant passage of potassium chloride solution to the solution to be measured takes place. However, such a passage of solution may considerably affect the result of the measurement of the ion concentration in the aqueous solution, if said aqueous solution is essentially salt-free, i.e. only contains ions in an extremely low concentration. Usually the pressure at the diaphragm is generated by means of a vessel containing the potassium chloride solution which is arranged approximately 50 to 100 cm above the reference electrode and connected with the electrode via a hose. However, this step is insufficient if the aqueous solution to be measured is pressurized, so that complex devices for generating the necessary overpressure in the potassium chloride solution are required.

Furthermore, the diffusion potential cannot be easily kept constant for waters having an extremely low content of salts as well as for flowing waters, because the concentration gradient between potassium chloride solution and water is extremely high. To eliminate this shortcoming, it has been recommended to use a diaphragm which, in comparison to the conventional small clay diaphragm, is relatively large and, in addition, symmetrically surrounds the glass electrode. An electrode arrangement of this type in the form of a so-called single rod measuring chain also eliminates the effect being known as flow error which is due to the fact that small pressure variations caused by flowing water change the potential of the reference electrode. However, a reference electrode having such a large surface also permits the passage of a relatively large quantity of potassium chloride solution into the aqueous solution, namely 1 to 2 ml/hr; this may cause a change in the pH value of unbuffered solutions and therefore it must be always ensured that sufficient potassium chloride solution is available as stock solution. Furthermore, the disadvantages of unbuffered media and, in addition, the extreme susceptibility to variations of the pressure of the aqueous solution to be measured are still not eliminated. On the other hand the measurement of the pH value under pressure is extremely important in the case of waters having a low content of salts, in order to prevent these waters from coming into contact with the atmosphere which, as stated above, may considerably change the pH value of the water concerned. For this reason, the reference electrode must be kept under pressure for these measurements, which results in the above stated difficulties.

In practice, the difficulties mentioned result in measuring errors which, for example, adversely affect the operational control of boiler feed-water or condensates. These measuring errors can only be kept within permissible limits by careful maintenance of the units and frequent, careful calibration. The result of all these facts together was that, so far, the methods for the determination of the concentration of relevant ions in aqueous solutions have only been slowly accepted in the field of boiler feed-water chemistry, although the determination of ion concentrations, in particular of the hydrogen ion concentration, gives excellent indications concerning the prevention of corrosion between water and material and the presence of important agents, such as hydrazine, ammonia, caustic soda solution, carbonic acid etc.

Accordingly, it is the object of the present invention to eliminate the disadvantages which are still encountered in the method mentioned in the beginning and to improve the method in such a manner that the above-mentioned measuring errors are avoided as far as possible and that the equipment required for the implementation of the method will essentially be maintenance-free.

According to the present invention this object is achieved by using a glass electrode, which is similar to the measuring electrode, as reference electrode and the water which directly comes from an ion exchanger as reference liquid.

If absolute concentration values are to be measured, it is expedient to use completely softened water as reference liquid and, accordingly, a reference ion exchanger which yields such completely softened water, for example, a mixed-bed ion exchanger. As the water directly coming from the ion exchanger is supplied to the reference electrode, it cannot be contaminated on its way to the reference electrode and therefore exactly has a pH value of 7. Since reference and measuring electrodes are similar, it suffices to feed also to the measuring electrode the same, completely softened water and to set the electrodes to zero. This enables the zero point of the measuring arrangement to be calibrated very exactly to the ion concentration of the water coming from the ion exchanger, said ion concentration having been measured with high accuracy in a different manner. Potential differences occurring in subsequent measurements are dependent on the type of electrode; depending on the type of electrode said potential differences are characteristic of specific ions. For example glass electrodes are particularly sensitive to hydrogen or sodium ions, while the potential of the glass electrodes largely corresponds to Nernst's formula and as a rule therefore needs no special calibration. It has been found that completely softened water not only has a pH value of 7 but also a pNa value of 7, so that completely softened water is suitable as reference liquid for measuring the absolute concentration values of hydrogen and sodium ions in aqueous solutions, using appropriate glass electrodes. In the case of electrode which are sensitive to other types of ions the concentration of the corresponding type of ion in waters coming from appropriate ion exchangers ought to be determined, in order to enable also absolute concentration values to be measured for such types of ions. According to the present invention redox potentials can be measured in the same manner, using as reference solution waters coming from ion exchangers.

Apart from the simplification of zero point determination and the cessation of regular calibrations of the measuring device, which considerably facilitates the application of the method according to the present invention, sources of errors are also eliminated through the fact that the aqueous solution to be measured and the reference liquid can be maintained under equal pressure and temperature conditions, so that measuring errors due to pressure and temperature influences are avoided and that practically no pressure differences and diffusion potentials which could adversely affect the measuring result are existing between the solution to be measured and the reference liquid, particularly in cases where the aqueous solution to be measured is essentially unbuffered and, for example, has a pH value of approx. 7. For this reason the method according to the present invention, in particular, permits the determination of pH and pNa values of waters having an extremely low content of salts. As explained above, continuous control of the pH and pNa values of waters having an extremely low content of salts has hitherto been practically impossible, so that in this case the present invention opens up a completely new field of application.

The potentiometric measurement of the ion concentration is always concerned with the measurement of the ratio of the concentrations in two different liquids one of which being used as reference liquid. For absolute measurement of the concentration in the aqueous solution to be examined the concentration of the same type of ions in the reference solution must be known. However, in many cases it is sufficient to know the ratio of the concentration in the solution to be examined to the concentration in the reference solution, that means, for example the deviation of the pH or pNa values of the aqueous solution to be examined from the corresponding values of the reference solution, the absolute values of the concentrations in the aqueous solution to be examined being therefore of no relevance.

It is understood that the method according to the present invention can also be applied to such comparative measurements.

In one preferred embodiment of the method according to the present invention one partial stream is continuously supplied from the aqeous solution under examination to the measuring electrode and another partial stream is continuously supplied from the aqueous solution under examination to the reference electrode after passing one or a plurality of reference ion exchangers. This variant of the method according to the present invention permits a particularly easy control of flowing aqueous solutions, especially of waters coming from ion exchangers. For measuring variations of the concentration of relevant ions in water which has been treated by means of ion exchangers it is therefore particularly advantageous to use a reference ion exchanger for the preparation of the reference solution, said reference ion exchanger having the same characteristics as the ion exchanger which has been used for the treatment of the water. In this case the concentration of the relevant type of ions at the outlet of the reference ion exchanger need not be known because the concentration of this type of ions in the treated water and in the reference solution must necessarily be equal, as long as the ion exchanger used for the treatment of the water works properly. On the other hand, even small deviations of the concentration of the ion type under control in the treated water with respect to the concentration of the reference solution — said deviations can be determined with very high accuracy by using the method according to the present inention — indicate changes in the behaviour of the ion exchanger used for water treatment, in particularly exhaustion, so that the method according to the present invention is especially suited for monitoring of ion exchangers and controlling regeneration processes.

The present invention also releates to an apparatus for the implementation of the method according to the present invention. This apparatus has one vessel with two chambers which are connected through a diaphragm; each chamber accommodates one of two similar ion-sensitive electrodes, one of the chambers being provided with an inlet for the aqueous solution and the other chamber being connected to the outlet of a series-connected ion exchanger. The electrodes are each connected with one input of a differential amplifier. A characteristic feature of this apparatus is its very simple construction and its almost universal applicability. It is particularly advantageous if the two chambers are connected by a line with a shutoff device, as a line of this type enables both chambers to be filled with the same liquid, in particular the same reference liquid, and by that the zero point of the apparatus to be adjusted or corrected.

For further details and variations of the invention, reference is made to the following detailed description and explanation on the embodiment shown in the drawing. The drawing shows a diagrammatic representation of an apparatus equipped for measuring the pH value.

The aqueous solution to be examined with the apparatus represented in the drawing is the water coming from an ion exchanger 1 from which a partial volume is branched off via a line 2. This partial volume is divided into two partial currents at the branch point 3. One partial current is led to the left chamber of a vessel 4 and the other partial current is led to the right chamber of the vessel 4 via a reference ion exchanger 5. The left chamber of the vessel 4 is provided with a measuring glass electrode 6, whereas the right chamber accommodates a glass electrode 7 serving as reference electrode. A diaphragm 8 is placed between the two chambers of vessel 4. In addition, the two chambers of vessel 4 are connected with each other via a line with a gate-type shutoff valve 9. In each of the lines leading from the branch point 3 or the reference ion exchanger to the chambers of vessel 4 one shutoff screw 10 or 11 is arranged which, apart from shutting off the inflow to the chambers, also permit the regulating of the liquid flow through the chambers. Finally, via an electrode cable the two glass electrodes 6 and 7 are connected to a differential amplifier 12 to which, in turn, a dial indicator 13, a recorder 14 and a digital read-out meter 14 are connected. In addition, a controller 16 which can trigger an acoustical or optical signal 17 and/or initiate a regeneration process for the ion exchanger via a line 18 when pre-selected limit values are exceeded, is connected to the differential amplifier 12.

When using the apparatus according to the present invention, zero adjustment is obtained by first lifting the gate of shutoff valve 9 and then shutting off the supply either to the left chamber by means of the shutoff screw 10 or to the right chamber by means of the shutoff screw 11, so that both glass electrodes receive the same kind of water. In the actual measurement, however, the gate valve 9 is closed and the shutoff screws 10 and 11 are set in such a manner that within unit time the same quantity of liquid passes through the two chambers of vessel 4. This ensures that the pressure in the two chambers is equal so that practically no liquid exchange through the diaphragm takes place. In addition, the temperature in the two chambers is practically equal as they are located in the same vessel, so that neither temperature influences can lead to false measuring results.

A particularly preferred field of application of the method according to the present invention for which the described apparatus is especially suited consists in the control of water which had been completely softened by way of the ion exchange process. In the process for complete softening the weakly acid cation exchanger, through which the water is usually passing first, exchanges the bivalent and also the univalent cations present in the water against hydrogen ions, as far as the latter are bonded to the anion hydrocarbonate. A decrease of the exchanger capacity becomes first evident by an increase of the pH value.

The following strongly acid cation exchanger, in turn, exchanges the remaining cations against hydrogen, so that this water takes up mineral acid, i.e. it becomes strongly acid. The mineral acid content of this water can very easily be determined by measureing the pH value. A decrease in the hydrogen ion concentration, i.e. an increase of the pH value, is the first sign of the exhaustion of the exchanger.

The exchanger through which, as a rule, the liquid flows after this is a weakly basic anion exchanger which exchanges the anions of the strong acids, such as chlorides, sulphates, nitrates, phosphates etc. against hydroxyl ions. However, since in water there is always an equilibrium between hydrogen ions and hydroxyl ions, also in this case the continuous determination of the pH value allows to monitor the operation of the exchanger, to cover the release of hydroxyl ions and to predict exhaustion also of this exchanger if the concentration of hydroxyl ions decreases or the pH value decreases.

In most cases, a strongly basic anion exchanger follows as the next exchanger which retains the anions of the weak acids, such as carbonic acid and silicic acid and, instead of this, gives off hydroxyl ions. Also this exchanger can be excellently controlled by measuring the pH value and in this case again, the exhaustion can be clearly seen from the decrease of the pH value.

Similar conditions are encountered in the mixed-bed ion exchanger. In an ion exchanger of this type the above-mentioned cation-exchanger resins and anion-exchange resins are present in a mixed condition. If the pH value increases the cation-exchange resin is exhausted, whereas the anion-exchange resin is exhausted if the pH value decreases.

The reason why the pH measurement, in particular behind the anion exchanger, has not been applied until now lies in the above-mentioned difficulties regarding the constancy of indication. At present, the method which is mainly used for covering the operation cycle of the anion exchangers consists in the determination of the electrolytic conductivity. However, this method only covers the break-through of the highly dissociated salts, i.e. of chloride ions and sulphate ions, for example. However, since generally silicic acid and carbonic acid break through first, this method is not suitable for the determination of the exhaustion time. Moreover, the water obtained during the normal operation cycle in many cases reacts alkaline, causing the conductivity to be higher than at the time of exhaustion where the reaction is from neutral to acid. The measuring value of the conductivity therefore frequently decreases at first when exhaustion begins and increases again only after the break-through of the highly dissociated salts.

Continuous silicic acid measurement which might be successfully applied in this case in inefficient, if not silicic acid but carbonic acid breaks through first.

For controlling ion exchangers it suggests itself to use as a reference solution the water to be examined which is circulated through a reference mixed-bed ion exchanger. This water is practically salt-free and neutral. The water leaving the reference exchanger is supplied to the reference electrode under pressure. As can be seen from the drawing, the water of which the pH value is to be determined is branched off upstream of the reference exchanger and supplied to the measuring electrode. Owing to the fact that the flow rates of the two partial currents of water are equal, the static pressure in the two measuring chambers is also equal. In this arrangement the diffusion of dissolved substances is largely precluded, as the concentration of salts is approximately equal in both samples, in contrast to the conventional reference electrode where an almost saturated potassium chloride solution is in interaction with the material under measurement.

The measuring amplifier to which the two glass electrodes are connected is a high-ohmic differential amplifier the inputs of which are suited for the connection of glass electrodes. An appropriate measuring amplifier is, for example, described in German Patent No. 1,498,526. The measuring amplifier is connected to an indicator which indicates the difference voltage between the two glass electrodes. As is common practice, calibration of the scale is effected in terms of pH values. If the hydrogen ion concentration upstream and downstream of the reference ion exchanger is equal, i.e. pH = 7, the indicated value is zero. If the hydrogen ion concentration increases, the potential of the measuring glass electrode rises to the poositive range, namely, corresponding to Nernst's formula, by approx. 57 mV for one concentration power of hydrogen ions. If the hydrogen ion concentration decreases, i.e. in the alkaline range, the reverse is the case. Naturally, care must be taken that the reference exchanger is fully functional. This can be ensured by not exceeding a given flow rate and by contacting the employed ion-exchange resin with an indicator dye which shows a colour change when exhaustion is beginning.

As stated above, a further application of the method according to the present invention consists in the controll of ion exchangers of a great variety of types. For this purpose the absolute magnitude of the pH value is of minor importance. In this case it is rather important if the pH value of the water to be examined, downstream of this ion exchanger, deviates from the pH value of the water downstream of the reference exchanger. For example, let the pH value downstream of a strongly basic anion exchanger be 8.5 owing to sodium slippage. The use of a reference exchanger, which in this case only contains strongly basic anion-exchange resin, does not cause a change in the pH value, as the reference exchanger does not change the water to be examined. However, towards the end of the exchange life of the exchanger to be monitored the pH value slowly decreases because the available hydroxyl ions are used up. The functional reference exchanger, however, still gives off hydroxyl ions so that in this case a pH difference results. This pH difference is an infallible indication of the exhaustion of the anion exchanger to be monitored. In this respect it does not matter whether weak or strong anions break through first; for example, traces of carbonic acid or silicic acid which break through are easily detected.

The so-called neutral point of the arrangement which has just been described is consequently not located at pH 7, but at pH 8.5, as both electrodes have the same potential at this pH value, i.e. the difference voltage is zero. If, in the example just described, the cation exchanger would break through even before exhaustion of the anion exchanger, i.e. if a considerably larger quantity of sodium would act on the anion exchanger to be controlled, the pH value would necessarily increase considerably in the water coming from the anion exchanger. However, since this exchanger might not yet be exhausted, neither would a change occur at the reference exchanger: the indication would again be zero.

Consequently, the above-mentioned pH value difference measurement is indicative of the condition of the anion exchanger. The method according to the present invention permits specific monitoring of the same quality also in the case of weakly acid cation exchangers. If, for example, the water is circulated through a weakly acid cation exchanger and said cation exchanger is monitored by measuring the pH value difference, using a reference exchanger of the same type, the cation exchanger to be monitored is fully functional as long as the difference of the pH values is zero. In this case the absolute pH value approximately is 4 to 4.5.

The special advantage of the method described by way of example is that, in contrast to the conventional determination of the absolute pH value, the carbonic acid set free during the ion exchange process does not adversely affect the indication result.

A strongly acid cation exchanger can also be monitored in the same manner. In the case of this exchanger process the absolute pH value of the water flowing out approximately is 1 to 3, the water therefore being mineral acid water. In the case of exhaustion of this exchanger the hydrogen ion concentration decreases, i.e. the pH value slowly increases. In the method according to the present invention, using a reference exchanger which, in this case, contains strongly acid cation material, the indication again is zero in the case of a proper exchange process. Especially in the case of particularly high hydrogen ion concentrations it is important that, in contrast to the conventional determination of the absolute value, the pH value measuring range can be considerably extended by using the method according to the present invention. According to this the apparatus described above has the measuring ranges ±0.5 pH and ± 3 pH deviation from the zero point located in the middle of the scale.

Concerning the control of ion exchangers by using the method according to the present invention it is of very particular importance that the individual measurement can be carried out in a specific manner by using a reference ion-exchange resin which respectively is of the same type as the ion exchanger to be monitored. As compared to the conventional pH value measuring method, the new method offers quite a great advantage concerning the operation. Whereas the use of a glass electrode and normal reference electrode requires calibration of the electrode and/or apparatus by means of two buffer solutions at relatively short time intervals, in the case of the application of the method according to the present invention only the zero point setting must be checked periodically, which can be effected without removing the electrodes, since the compensation of the absolute voltage, i.e. of the electrode zero point, only requires the two electrodes to be put into the same water, for example into the water to be exchamined. In the apparatus according to the present invention this procedure can be initiated by means of a small gate valve. Only for the purposes of the electrode conductance check, which must be carried out at long time intervals of approximately six months, each measuring chamber is conventionally filled with a pH buffer solution, the pH value difference of which at the apparatus serving for the calibration of the conductance. Thus, apart from considerable advantages from the point-of-view of measuring engineering, advantages are also obtained with regard to the maintenance of the apparatus.

Furthermore, it is known that in the case of the so-called neutral or base exchanger a marked pH value shift can be noticed towards the end of the exchange life. This shift is due to the fact that during normal operation carbonic acid of the raw water is reretained by the exchanger; subsequently, the carbonic acid breaks through when the exhaustion begins. However, the absolute magnitude of the decreasing pH value is extremely small and is in the order of 0.1 to 0.5 pH. That is why this fact has hitherto not been applied in practice. However, the method according to the present invention permits the characteristic and representative display of the pH value change by using a reference neutral (base) exchanger.

A further variant of the method according to the present invention consists in the variety of electrodes which are provided for the respective control function. Today, glass electrodes are available which, in addition to the normal pH sensitivity, also possess sensitivity properties with respect to other univalent and bivalent cations, in particular with respect to sodium or calcium. The use of a sodium-sensitive electrode for the potentiometric determination of sodium, for example after mixed-bed ion exchangers in the conventional manner, has the disadvantage that the water sample to be examined must always be standardized to a pH value of more than 9.5 in order to obtain a sodium-selective measurement (cf. Ammer: "Vom Wasser," Vol 34, 1967 page 366, FIG. 2). Experiments carried out by the inventor showed that for the indication of the exhaustion of mixed-bed ion exchanger not only the above described method of measuring the difference by means of two identical pH gas electrodes can be used but that a difference measuring method by means of two sodium glass electrodes also yields a reliable indication of the exhaustion. The difference measurement by means of two sodium glass electrodes, however, also permit the measurment of the absolute concentration of sodium ions in a solution to be measured, if the concentration of the sodium ions in the reference solution is known. Intensive measurements carried out by the inventor surprisingly revealed that completely softened water also contains $10^{-7}$ val sodium, so that completely softened water, as reference solution for the sodium concentration with one pNa $-7$, can be used for the determination of the absolute pNa value by means of two sodium-sensitive glass electrodes. Hence, also in this case the invention offers completely new ways of measuring the sodium ion concentration in solutions, that is also in solutions with a pH value of 7 and up. Consequently, completely softened water needs not to be alkalized in order to measure its sodium content.

Since electrodes are available which are more sensitive to other ions than to hydrogen and sodium ions, it is understood that the invention is not limited to the measurement of hydrogen and sodium ion concentrations but relates in general to the application of electrodes of the same type in connection with reference ion exchangers. As mentioned above, calciumsensitive glass electrodes are already known. Moreover, there are special electrodes which are sensitive to various cations and ions, said electrodes being also suited for the method according to the present invention. Finally, the method according to the present invention shall also cover the measurement of redox potentials, using two identical electrodes and one electron exchanger for the preparation of the reference solution.

It is further understood that, apart from an excellent operation, monitoring of practically any ion exchange type, the method according to the present invention, in addition, permits the control of regeneration processes by indicating the break-through of regenerating agents.

The particular advantages of the method as well as of the apparatus according to the present invention can be summarized as follows:
1. Abolition of the conventional reference electrode with its characteristic troubles;
2. practicability of measurements under pressure, in order to eliminate the influence of the carbonic acid contained in the atmosphere;
3. practicability of concentration measurement in media with an extremely low content of salts;
4. elimination of pressure and flow errors in the case of continuous measurement by arranging equal flow rates in the measuring and reference systems;
5. approximately equal salt concentrations in the measuring and reference systems;
6. application of the pH measurement for specific monitoring of ion exchangers by using a homologous reference ion exchanger;
7. easy adjustability of the measuring zero point by opening the partition of the chambers; and
8. exact absolute measurements when using a mixed-bed ion exchanger as reference exchanger.

I claim:

1. A method for the determination of the concentration of specific ions in a first aqueous soltuion comprising, directing the first aqueous solution containing the specific ions to a first chamber, directing a second aqueous solution having the specific ions of the first solution to an ion exchanger, treating the second solution in the ion exchanger and exchanging the specific ions of the second solution such that a third aqueous solution having a known concentration of the specific ions emerges from the ion exchanger, directing the third aqueous solution containing the known concentration of the specific ions to a second chamber, bringing the first and third aqueous solution within the first and second chambers, respectively, into communication through a diaphragm, positioning a first measuring electrode sensitive to the specific ions in the aqueous solution in the first chamber, positioning a second measuring electrode similar to the first electode in the third aqueous solution in the second chamber and measuring the potential difference between the electrodes in the chambers.

2. The method as recited in claim 1, wherein the third aqueous solution emerging from the ion exchanger is completely softened water.

3. The method as recited in claim 1, wherein the first aqueous solution is continuously supplied to the first chamber and the first electrode, and the third aqueous solution is continuously supplied to the second chamber and the second electrode.

4. The method of claim 3, wherein the first aqueous solution is initially treated in another ion exchanger having the same characteristics as the said ion exchanger.

* * * * *